United States Patent [19]
Jirka

[11] 3,935,384
[45] Jan. 27, 1976

[54] NETWORK FOR GENERATING A CRT CONTROL SIGNAL FOR ENHANCING THE EDGES OF TELEVISION IMAGES

[75] Inventor: Howard F. Jirka, Mount Prospect, Ill.

[73] Assignee: Zenith Radio Corporation, Chicago, Ill.

[22] Filed: Jan. 2, 1975

[21] Appl. No.: 537,865

[52] U.S. Cl. ................... 178/7.5 R; 178/DIG. 34
[51] Int. Cl.² .......................................... H04N 5/14
[58] Field of Search... 178/7.5 R, DIG. 34, DIG. 25; 358/37

[56] References Cited
UNITED STATES PATENTS

| | | | |
|---|---|---|---|
| 2,678,964 | 5/1954 | Loughlin | 178/7.5 R |
| 3,830,958 | 8/1974 | Fuse et al. | 178/7.5 R X |
| 3,849,792 | 11/1974 | Holzrichter | 178/DIG. 25 |

*Primary Examiner*—Benedict V. Safourek
*Assistant Examiner*—Mitchell Saffian
*Attorney, Agent, or Firm*—John H. Coult

[57] ABSTRACT

A low cost network for use in a television receiver for receiving a video signal and generating therefrom both a control signal for modulating the scan velocity of a CRT electron beam and a delayed video signal for intensity modulating the CRT electron beam with picture information. The network uses only one delay line for generating the control signal and the delayed video signal. A video signal is applied to an impedance means followed by a delay means coupled to a reflecting termination. The impedance of the impedance means is substantially equal to the characteristic impedance of the delay means. An output terminal from which the control signal is taken is included at a point between the impedance means and the delay means. The delayed video signal is generated by means responsive to the signal received by the reflecting termination from the delay means. The network may also be used to generate preshoot and overshoot peaking components for peaking the delayed video signal.

5 Claims, 9 Drawing Figures

_Fig. 8_

NETWORK FOR GENERATING A CRT CONTROL SIGNAL FOR ENHANCING THE EDGES OF TELEVISION IMAGES

BACKGROUND OF THE INVENTION

This invention relates generally to television receivers and is specifically directed to a network for use in improving the apparent resolution of images displayed by television CRT's (cathode ray tubes) by modulating the scan velocity of the CRT electron beam.

The sharpness and crispness of a television image is dependent on factors such as the bandwidth of the transmitted signal, the bandwidth of the receiver circuitry, and the resolution capabilities of the image reproducing device. In the case of television receivers using cathode ray tubes as image reproducing devices, the spot size of the scanning electron beam is an important parameter in determining overall resolution capability.

In most cathode ray tubes, the spot size of the electron beam increases significantly as the beam current is increased. Therefore, when a large black-to-white video transition occurs, i.e., when a TV image includes a white area immediately following a black area, the spot size of the beam grows concurrently with the increase in the luminance signal. To a television viewer, the overall effect is that, in the case of a white stripe on a black field, for example, the edges of the stripe will appear to be blurred because of the fact that the electron beam spot is scanning and varying in size simultaneously. The white area will generally appear expanded and the black area correspondingly reduced in size. In the case of commercial color television programming, the net effect of spot size variance with luminance transitions is a television image which is less crisp than is desirable. This is particularly true where the picture contains many highlights, in which case the spot size of the scanning electron beam may grow to be as large as ¼ inch and completely obscure some video detail.

In an attempt to improve the crispness of television images, the prior art has improved the bandwidth of television circuitry, improved electron guns so as to produce electron beams having smaller spot size, included "peaking" circuitry in the luminance channels of the receivers to generate steeper luminance transitions, and developed image enhancement systems for increasing the sharpness of television images by modulating the scan velocity of the CRT electron beam.

Examples of such image edge enhancement systems are disclosed in U.S. Pat. Nos. 2,678,964 and 3,830,958, for example. Briefly, one of the methods disclosed therein consists of processing the luminance signal to develop therefrom a control signal which corresponds to a derivative of the luminance signal. The control signal is then used to modulate the scan velocity of the CRT electron beam. The variance in the scan velocity of the beam can, as pointed out in the abovementioned patents, result in a reproduced video image which has sharper edges, particularly on large black-to-white or white-to-black transitions.

As shown in the U.S. Pat. No. 3,830,958, for example, a control signal which corresponds to the derivative of the video signal, can be generated with a network which includes two delay lines. Such a network also provides a delayed video signal for use in intensity modulating the CRT electron beam with picture information. Delaying the video signal before applying it to the CRT is necessary to provide the correct timing relationship between the control signal and the video signal used to generate the video image.

Although the two delay line network is an effective means for generating the required signals, the use of two delay lines makes it an expensive network, particularly in view of the fact that most television receivers already include circuitry (video peaking circuitry) for enhancing the sharpness of the television images. Consequently, the improvement in resolution which is afforded by modulating the scan velocity of the CRT electron beam has not been incorporated into consumer television receivers. A network capable of generating the control signal and the delayed video signal and which does not require two delay lines would lower the cost of the network and hasten the entry of this form of image edge enhancement into the consumer market.

OBJECTS OF THE INVENTION

It is a general object of this invention to provide a network for generating a control signal for modulating the scan velocity of a television CRT electron beam so as to enhance the sharpness of the television image.

It is a more specific object of this invention to provide such a network which is less expensive than prior art networks which generate a similar control signal.

It is a further object of this invention to provide such a network which is capable of generating both of the control signal and a delayed video signal for use in such an edge enhancement scheme with the use of only one delay line.

It is yet another object of this invention to provide a one delay line network capable of generating not only the control and delayed video signals, but also capable of generating a peaking signal for application to and peaking of the delayed video signal, thereby further lowering the effective cost of the network.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings in which:

FIG. 9 depicts a color cathode ray tube having a pair of auxiliary deflection plates for receiving the amplified control signal and for modulating the scan velocity of the electron beam.

DESCRIPTION OF THE PREFERRED EMBODIMENT

Before proceeding to a discussion of the present invention, a brief explanation will be given of how modulating the scan velocity of a CRT electron beam enhances the crispness of the television image and how the prior art generated the control signal for this beam modulation.

Figure 1:
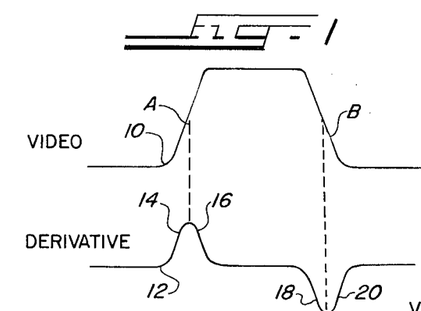
FIG. 1 depicts a set of waveforms useful in describing how the sharpness of a television image can be improved by modulating the scan velocity of the CRT electron beam.

Referring to FIG. 1, there is shown an exemplary video waveform 10 which, it will be assumed, is used to intensity modulate a CRT electron beam. As shown, video waveform 10 begins at a black level, rises quickly to a white level at which it remains for an interval, and then quickly returns to the black level. It has a finite rise time and fall time, due in part to the bandwidth of the television system. Because of the finite and sometimes undesirably slow rise time of such video waveforms, the image which they generate on the CRT is less sharp than is desired. Many receivers include peaking circuitry for generating preshoot and overshoot peaking components for addition to the video signal in order to effect a more crisp and pleasing television image.

As pointed out above, the television image may also be given a more crisp appearance by modulating the scan velocity of the CRT electron beam with a control signal which corresponds to the derivative of the video signal which is simultaneously intensity modulating the CRT electron beam. The derivative of video signal 10 is shown as waveform 12 in FIG. 1. Derivative waveform 12 should have a time correspondence to the video signal as indicated in FIG. 1; that is, the peaks of the derivative waveform should occur near the central portions, A and B, of the rise and fall times of the video signal.

When derivative waveform 12 is applied to an auxiliary electron beam scan device, one of which will be described below, the scan velocity of the electron beam will be modified as follows. When leading edge 14 of waveform 12 reaches the auxiliary scan device, a field will be set up within the CRT which causes the electron beam scan to be accelerated above its normal scan rate so that the beam moves ahead to a location which corresponds to that point on the CRT at which the sharp image edge is to be established. This point preferably corresponds to the midpoint of the rise time of the video waveform, such as point A in FIG. 1. Trailing edge 16 of waveform 12 then causes the electron beam to be deaccelerated below its normal scan rate so that the electron beam spot is maintained for a somewhat longer time at a position on the CRT which corresponds to the point where the sharp image is to be established. The effect of speeding up the electron beam and the subsequent slowing down thereof is to cause that area of the CRT which immediately proceeds the sharp video transition to be somewhat darker than normal since the electron beam spends less time there. Since the electron beam is slowed down at a point on the screen where the sharp edge is to be established, that area of the screen will seem somewhat brighter than normal. The effect is to create a much sharper image edge at the point on the screen which corresponds to the midpoint of the video signal rise.

In the case of a video signal such as 10 in FIG. 1, which may correspond to a white stripe on a black field, the effect of the above describes modulation of the electron beam scan rate will be to narrow the white stripe and cause it to more nearly correspond to an image which a signal having a much faster rise time should produce.

When video waveform 10 is falling from a white level to a black level, derivative waveform 12 goes negative. Edge 18 of waveform 12 causes the scan velocity of the electron beam to decrease and to form a bright, sharp image at a point on the screen which preferably corresponds to point B of waveform 10. Edge 20 of waveform 12 then causes the scan velocity of the electron beam to increase to make up for the time lost by the action of edge 18.

Figure 2:
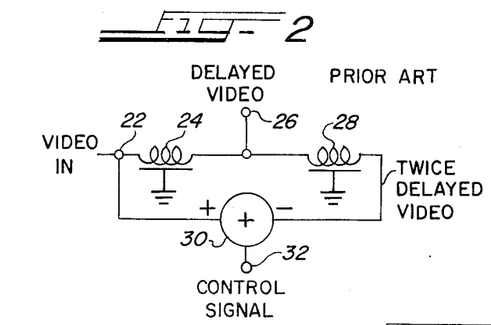
FIG. 2 is a schematic illustration of a prior art network for generating a control signal for modulating the scan velocity of a CRT electron beam and a delayed video signal for intensity modulating the CRT electron beam.

Referring now to FIG. 2, there is shown a prior art network for generating a waveform similar to derivative waveform 12 shown in FIG. 1. This network includes an input terminal 22, a first delay line 24, a delayed video output terminal 26, a second delay line 28, an adder 30 and a control signal output terminal 32. The control signal which is available at terminal 32 is, as will be shown, similar to the derivative waveform 12 of FIG. 1.

Figure 3:
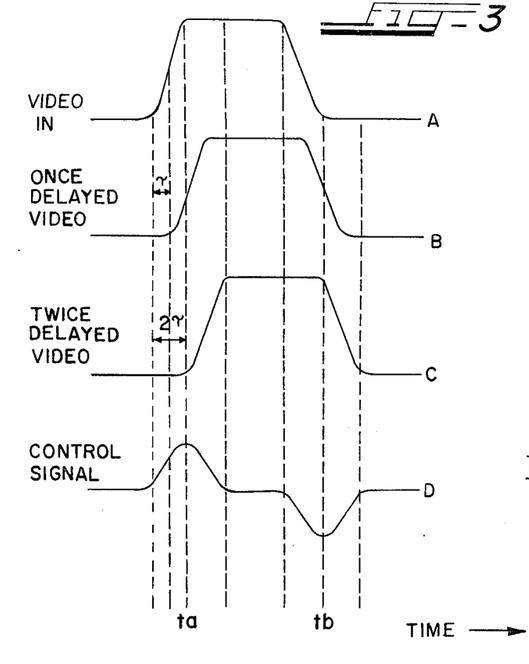
FIG. 3 depicts a series of waveforms useful in understanding the prior art network of FIG. 2.

An exemplary video input waveform, waveform A, is shown in FIG. 3 along with other waveforms which occur at other points in the network of FIG. 2. The video input which is applied to terminal 22 is delayed by an interval $\tau$ by delay line 24. The once-delayed video waveform, waveform B of FIG. 3, is available at terminal 26 and constitutes that video signal which is used to intensity modulate the CRT electron beam with picture information. The video input waveform is then delayed again by an interval $\tau$ by delay line 28 so that a waveform delayed by two $\tau$, as shown in FIG. 3, waveform C, constitutes one input to adder 30. The other input to adder 30 is the video input signal which has not been delayed.

The control signal which modulates the scan velocity of the CRT electron beam is the output of adder 30 and is available at terminal 32. As shown in FIG. 3, waveform D, this control signal is similar to the derivative waveform shown in FIG. 1. Note that the peaks of the control signal, at points $t_a$ and $t_b$ in FIG. 3, correspond to the midpoint of the rise and fall times of the once-delayed video signal. If the video signal which is used to intensity modulate the CRT electron beam were not delayed as it is in the FIG. 2 network, the required correspondence between it and the control signal would not exist. Thus, any network which delays the video signal to generate the type of control signal discussed herein must also delay the video signal which has the picture information in order to generate the necessary time correspondence between the two signals.

As pointed out above, a problem with the FIG. 2 prior art network is that two delay devices are required to generate the delayed video signal and the control signal. According to one aspect of this invention, both such signals can be generated by a network which uses only one delay device. Such a network will now be discussed.

Figure 4:
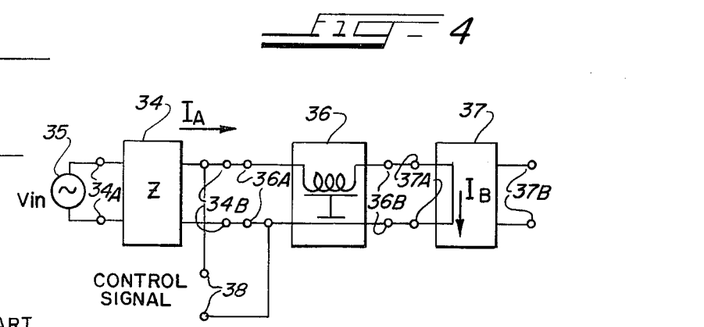
FIG. 4 depicts a network for generating the control signal and the delayed video signal in accordance with this invention.
Figure 5:
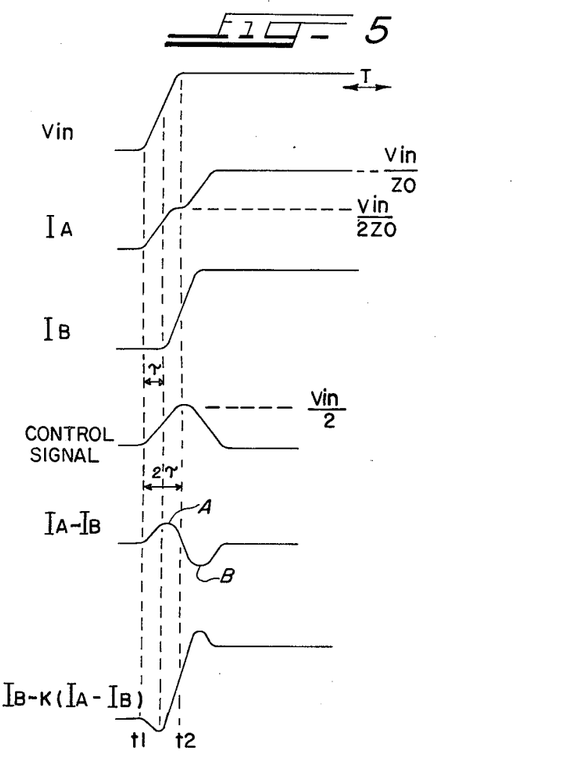
FIG. 5 depicts a series of waveforms useful in understanding the operation of the FIG. 4 network.

Referring to FIG. 4, there is shown a network which uses only one delay device but which, nevertheless, is able to generate the necessary signals required to develop both the correction signal and the delayed video signal. FIG. 5 is a waveform diagram showing a number of waveforms which appear at various points in the FIG. 4 network.

As shown, the FIG. 4 network includes impedance means 34 which has an input port 34A and an output port 34B. Impedance means 34 and the other components of the FIG. 4 network are shown in a generalized form as being four-terminal, two-port networks for purposes of generality to illustrate the broader aspects of this invention. Specific embodiments of this invention which will be described below do not necessarily include the type of four-terminal networks shown in FIG. 4. However, since the broader aspects of this invention encompass the use of four-terminal networks as well as more conventional two-terminal elements, the invention will first be described in terms of four-terminal, two-port networks.

As shown, a voltage generator 35 applies a video signal to the input port 34A of impedance means 34. In response to the voltage applied at port 34A, a current $I_A$ is generated at the output port of impedance means 34.

Impedance means 34 is coupled in cascade to delay means 36; that is, the output port 34B of impedance means 34 is coupled to the input port 36A of delay means 36. (As used herein and in the appended claims, the term "cascade" refers to an electrical connection whereby the output port of one element or network is connected to the input port of the next succeeding element or network.) Delay means 36 is shown as consisting of a delay line since that is the preferred construction of delay means 36. However, other delay means such as acoustic delay lines may also be used. In any case, delay means 36 has a characteristic impedance $Z_0$ associated with it. For proper operation of the network, the impedance appearing at output port 34B of impedance means 34 should be equal to the characteristic impedance $Z_0$ of delay means 36. Generally, the characteristic impedance of delay means 36 will have both a real and a reactive component. Thus, impedance means 34 will usually include a linear resistance and one or more reactive components.

Delay means 36 has its output port 36B coupled to the input port 37A of reflecting termination 37. Termination 37 must reflect the signals received by it from delay means 36 back through delay means 36. The signals will then be absorbed by the impedance presented at the output port 34B of impedance means 34.

Although termination 37 is drawn as a two port network, it may take the form of a one port network which consists of a short circuit termination through which a current $I_B$ flows, as indicated in FIG. 4. While the short circuit is a preferred embodiment of the termination, it is necessary only that the termination used be reflective of signals received from delay means 36 in the frequency range of the video signal.

In the case where termination 37 takes the form of a short circuit, the control signal for modulating the scan velocity of the CRT electron beam is available at a point between impedance means 34 and delay means 36. An output terminal 38 is provided for gaining access to the control signal.

FIG. 5 illustrates the input voltage, $V_{in}$, applied to input port 34A. In this case, only the leading edge of the waveform is shown since that is all that is deemed necessary to explain the operation of this network. The remaining waveforms shown in FIG. 5 are drawn with the assumption that termination 37 of FIG. 4 is a short circuit.

When the input voltage, $V_{in}$, at port 34A begins to rise at time $t_1$, the current $I_A$ in impedance means 34 also begins to rise. Because of the delay $\tau$ associated with delay means 36, the current $I_B$ in termination 37 will not yet have begun. $I_A$ rises with $V_{in}$ and approaches a level equal to $V_{in}/2Z_0$. At $t_2$, after an interval of two $\tau$, the input signal has travelled through delay means 36 and has been reflected back to a point between impedance means 34 and delay means 36. Since there is a phase reversal in the reflected wave, the voltage at the terminal marked "control signal" begins to drop to zero and $I_A$ then climbs to a new level equal to $V_{in}/Z_0$.

Note that after an interval $\tau$, when the input voltage $V_{in}$, has travelled through both impedance means 34 and delay means 36, the current $I_B$ flowing in termination 37 begins to rise toward its steady state level, $V_{in}/Z_0$.

The waveform labelled "control signal" in FIG. 5 shows the voltage which appears at terminal 38. As shown, the control signal rises concurrently with $V_{in}$. However, after an interval of two $\tau$, $V_{in}$ is reflected back through delay means 36 to terminal 38. But since the reflected waveform is 180 degrees out of phase with $V_{in}$, it tends to cancel $V_{in}$ at terminal 38 and force the voltage there to fall toward a zero level. Note that the control signal has the shape of a waveform which is similar to the derivative of $V_{in}$. Therefore, the signal available at terminal 38 can be used as the control signal for modulating the scan velocity of the CRT electron beam. The signal available at terminal 38 is, in fact, identical to the control signal available at terminal 32 of the FIG. 2 network.

Note that the current $I_B$ in termination 37 has been delayed by an interval $\tau$ from the input signal $V_{in}$. Also, the peak of the control signal is coincident with the midpoint of the rising slope of the current $I_B$. Therefore, the current $I_B$ may be used as the delayed video signal which is used to intensity modulate the CRT electron beam. Thus, by taking advantage of the possibilities inherent in a delay device such as a delay line, the network shown in FIG. 4 can be used to generate both the delayed video signal and the control signal.

According to another aspect of this invention, the currents generated in the FIG. 4 network may also be used to generate peaking components for peaking the delayed video signal before its application to the CRT. Note the waveform labelled $I_A$-$I_B$ in FIG. 5. Point A on the $I_A$-$I_B$ waveform corresponds to a preshoot component of a peaking signal while point B of that waveform corresponds to an overshoot component. If the current $I_B$ is combined with a fraction of the $I_A$-$I_B$ current, a signal corresponding $I_B$-K ($I_A$-$I_B$) may be generated. Such a signal is shown in FIG. 5. Note that this video signal now has a preshoot as well as an overshoot component and thus is peaked so as to enhance the crispness of the image which it generates. Thus, not only in the FIG. 4 network capable of generating both a delayed video signal and a control signal for image edge enhancement, it is also capable of generating peaking components for application to and peaking of the video waveform which is used to generate the television image.

As pointed out above with reference to FIG. 4, it is necessary only that termination 37 for delay device 36 be reflective of signals in the frequency range of the video signal. The invention has thus far been described, however, only in terms of a termination which effectively appears as a short circuit at the output of the delay device. It is possible, however, to generate the required reflection of the delayed signal by allowing termination 37 to take the form of an open circuit. In that case, the control signal for modulating the scan velocity of the CRT electron beam takes the form of a current rather than a voltage and is that current which flows in the loop formed by output port 34B of impedance means 34 and input port 36A of delay means 36. The current flowing in that loop can be detected and used to generate the required control signal. The voltage which appears at the open circuit termination of delay means 36 can be used as the delayed video signal for intensity modulating the CRT electron beam. The above described peaking signal takes the form of the difference between two voltages $V_1$ and $V_2$ where $V_1$ is the voltage across output port 34B and $V_2$ is the voltage across the open circuit termination of delay device 36.

In many cases the video input signal applied to input port 34A of the FIG. 4 network may contain 3.58 MHz color subcarrier components. Such components are undesirable in the control signal for modulating the electron beam scan velocity. A method by which these unwanted 3.58 MHz components may be eliminated from the control signal is to insure that the delay $\tau$ of delay means 36 is substantially equal to one half the period of 3.58 MHz color subcarrier signal. In this way, all 3.58 MHz components will be cancelled at output terminal 38.

As pointed out above, the current $I_B$ (FIG. 4) may be used as the delayed video signal. However, in many applications it is desirable to convert $I_B$ to a proportional voltage for application to a CRT control electrode. Therefore, a device is needed which is responsive to the current $I_B$ in termination 37 for generating a voltage which is substantially proportional to $I_B$ for use as the delayed video signal. Also desirable is a means for generating another current which is proportional to $I_A$ so that the currents $I_A$ and $I_B$ may be matrixed to generate the preshoot and overshoot components desired to peak the delayed video signal.

Figure 6:
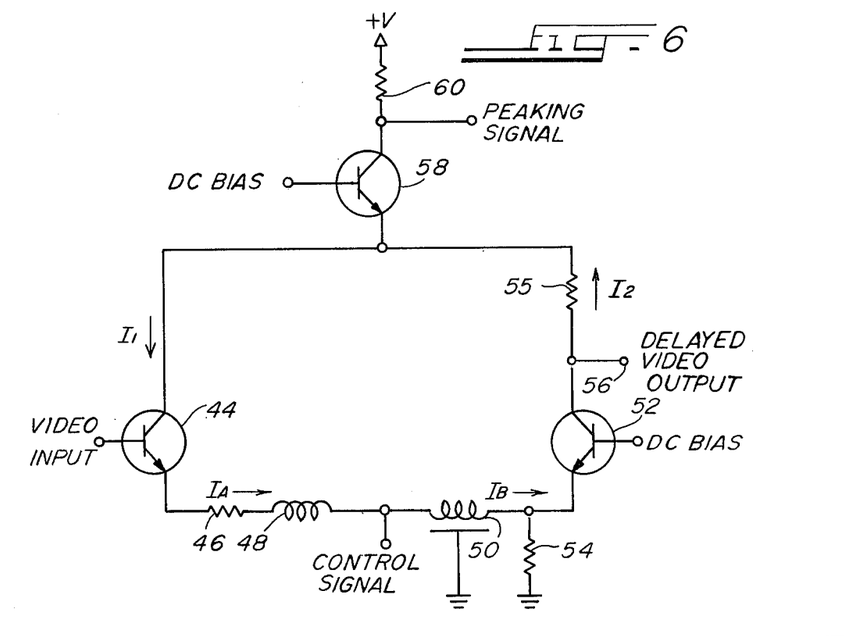
FIG. 6 depicts an embodiment of this invention which includes means for generating preshoot and overshoot peaking components for peaking the delayed video signal.

Referring now to FIG. 6, there is shown a network which is a preferred embodiment of the FIG. 4 network and which converts the current $I_B$ to a proportional voltage and which generates new currents which are proportional to the currents $I_A$ and $I_B$ for generating a peaking signal.

As shown, the FIG. 6 network includes a first transistor 44 which receives the video input signal at its base. The emitter of transistor 44 is coupled to a resistor 46 in series with an inductance 48. Resistor 46 and inductance 48 constitute the impedance means 34 of FIG. 4. Together, the impedance of elements 46 and 48 equals the characteristic impedance of delay line 50 to which they are coupled. The control signal is taken at a point between inductance 48 and delay line 50.

A second transistor 52 has a DC bias applied to its base terminal. The emitter of transistor 52 is coupled to delay line 50 and to resistor 54 which may be returned to a voltage reference level such as ground as is done here. The impedance seen by delay line 50 looking into the emitter of transistor 52 is low enough to simulate the short circuit reflecting termination needed to properly terminate the delay line.

Transistor 44 is responsive to the current $I_A$ through resistor 46 and inductance 48 and generates a collector current $I_1$ through its collector branch which is proportional to current $I_A$. Transistor 52 is responsive to the current $I_B$ flowing out of delay line 50 and generates a current $I_2$ in its collector branch which is proportional to the current $I_B$. The current $I_2$ flows through resistor 55 and develops across it a voltage which is proportional to the current $I_2$. The voltage at terminal 56 is the delayed video signal which is applied to the CRT to intensity modulate the electron beam.

Transistor 58 has a DC bias voltage applied to its base and has its emitter tied to the collector branches of both transistor 44 and transistor 52. Currents $I_1$ and $I_2$ both flow through the collector branch of transistor 58 and develop across resistor 60 a voltage which is proportional to $I_A$-$I_B$ and is the peaking signal which is required to properly peak the delayed video output signal available at terminal 56.

Figure 7:
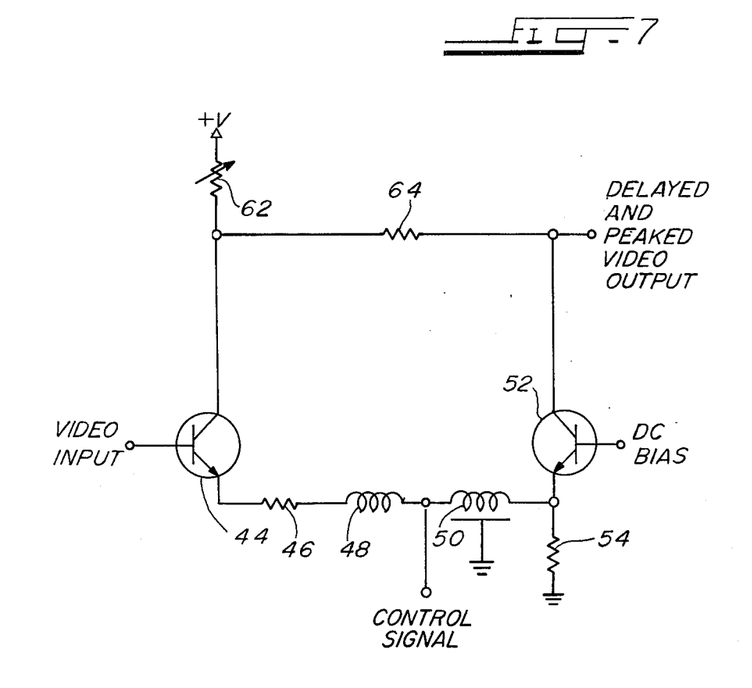
FIG. 7 depicts another embodiment of this invention which has an output consisting of a video signal which has been both delayed and peaked.

In some cases it is desirable to generate an already peaked and delayed video signal within the control signal generating network. An example of a simple means by which this may be accomplished is shown in FIG. 7. As shown, the FIG. 7 network is similar to that of FIG. 6 except for the differences in the collector branches of transistors 44 and 52. As shown in FIG. 7, the collector branches of transistors 44 and 52 are coupled to resistors 62 and 64 across which is available the delayed and peaked video output signal. Resistor 62 has been shown as variable in order to vary the amount of peaking which is applied to the delayed video signal.

Figure 8:
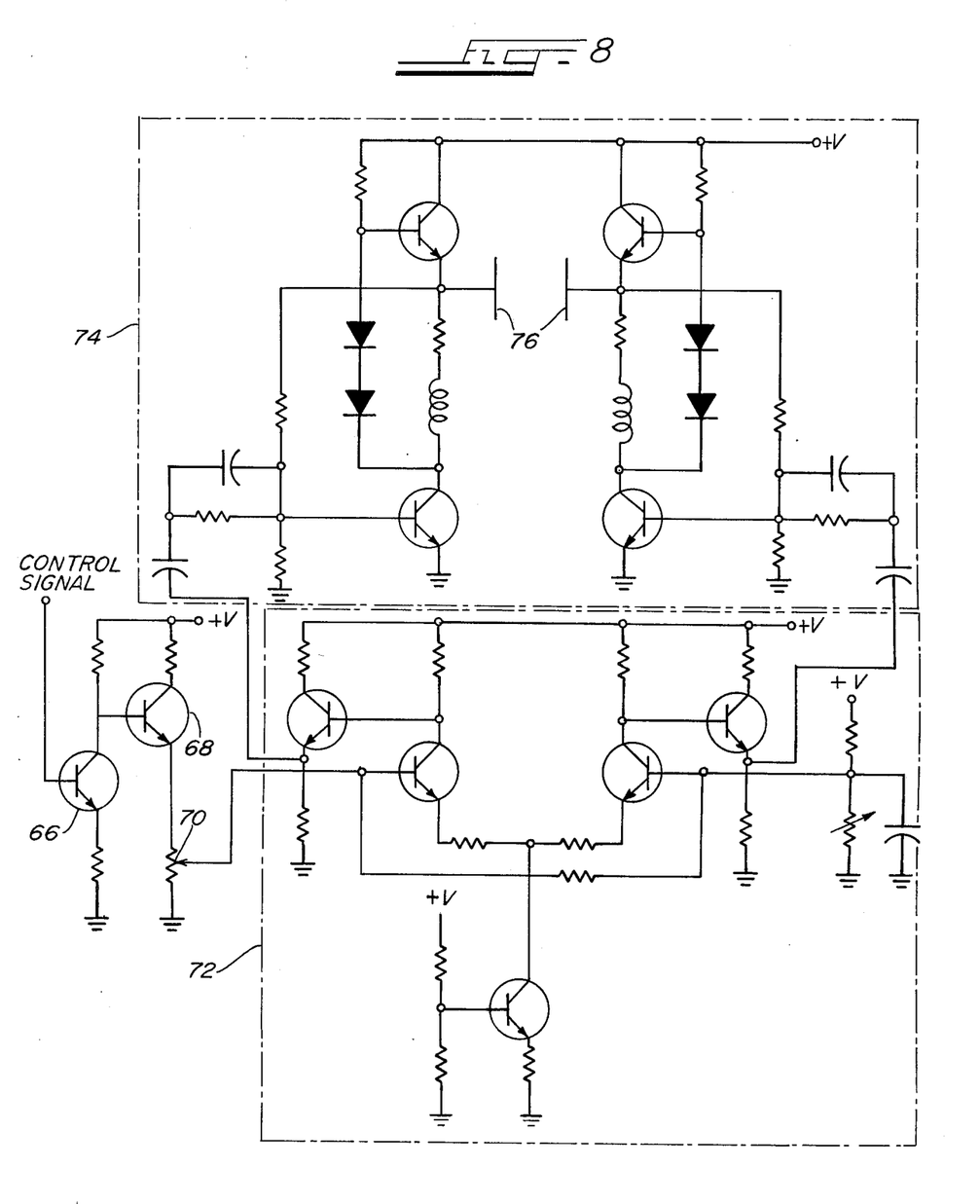
FIG. 8 depicts an amplifier for amplifying the control signal developed by this invention and for applying it to auxiliary electron beam deflection plates.

Having now described the invention, apparatus for applying the generated control signal to the CRT to modulate the scan velocity of the electron beam will now be illustrated. Referring to FIG. 8, there is shown a schematic diagram of a network for amplifying the control signal before application thereof to an auxiliary electron beam scan device. As shown, the control signal is applied to the base of transistor 66 which amplifies it and applies it to emitter follower transistor 68. The emitter of transistor 68 is tied to a potentiometer 70 for varying the amplitude of the control signal which is applied to the subsequent stages of amplification.

The control signal which appears at the tap on potentiometer 70 is applied to amplifier 72, shown within the dashed lines. Amplifier 72 is an ordinary differential amplifier which supplies differential outputs to amplifier 74. Amplifier 74 further amplifies the differential control signal and applies the amplified control signal in push-pull fashion to a pair of auxiliary deflection plates 76. The amplitude of the control signal applied to plates 76 is approximately 300 volts peak to peak.

The auxiliary deflection plates 76 which are shown schematically in FIG. 8 are shown in a perspective view in FIG. 9. As shown, plates 76 are mounted within the neck of a CRT 78 and immediately forward of an otherwise conventional electron gun 80.

Deflection plates 76 are positioned to apply an electric field to the electron beams which emerge from electron gun 80 so as to generate an auxiliary deflection field which accelerates and de-accelerates the electron beam scan in its normal direction of scan. These deflection plates are shown and explained in more detail in copending application Ser. No. 519,980 entitled "Edge Enhancement for Television Images" and assigned to the assignee of this invention.

The control signal is coupled to the deflection plates through the neck of CRT 78 by applying the signal to conductive coating 82 which appears on the outer surface of CRT 78. Another conductive coating 83 lies on the inner surface of the neck of CRT 78 and in alignment with coating 82. Together, the inner and outer conductive coatings form a capacitor through which the control signal passes. Once through the neck of the CRT, the control signal is conducted to an auxiliary deflection plate through snubber spring contact 84 which has one end rigidly attached to an auxiliary deflection plate 76 and the other end spring biased onto inner conductive coating 83.

As shown in FIG. 9, each deflection plate 76 is serrated to reduce eddy currents induced by the yoke field which would otherwise degrade convergence. Note also that the ends of each deflection plate 76 are bent inwardly in order to maintain a uniform field across the space between them.

Auxiliary deflection plates 76 may be constructed without serrations provided that they are made of a material which is not so conductive as to short out part of the horizontal deflection field. For example, plates constructed of tin oxide on glass or AQUADAG on glass are suitable.

The invention described above is deemed to be one which will reduce the cost of the electronics required in image edge enhancement systems and hasten the entry of such enhancement systems into the consumer market. While this invention has been described in conjunction with several specific embodiments, many alterations, modifications and variations will be apparent to those skilled in the art in light of the teachings herein. Accordingly, it is intended to embrace all such alterations, modifications and variations which fall within the spirit and scope of this invention as defined by the appended claims.

I claim:

1. In a television receiver, a network for receiving a video signal and generating therefrom both a delayed video signal for intensity modulating a CRT electron beam with picture information and a control signal for modulating the scan velocity of the CRT electron beam so as to enhance the sharpness of the television image, said network comprising, in cascade:
   impedance means having an input port and an output port;
   delay means having an input port and an output port with its input port coupled to the output port of said impedance means, the impedance means having an impedance at its output port which is substantially equal to the characteristic impedance of the delay means;
   a reflecting termination coupled to the output port of said delay means, which termination is reflective of signals received from said delay means and in the frequency range of the video signal;
   means for applying the video signal to the input port of said impedance means;
   an output terminal at a point between said impedance means and said delay means from which the control signal is taken; and
   means responsive to the signal received by the reflecting termination from said delay means for generating a signal for use as the delayed video signal which is substantially proportional to the signal received by the reflecting termination.

2. A network as set forth in claim 1 which includes means responsive to the current in the output port of said impedance means and to the signal received by the reflecting termination from said delay means for generating first and second currents which are proportional to the current in the output port of said impedance means and to the signal received by the reflecting termination, respectively, and for matrixing said first and second currents to generate preshoot and overshoot peaking components for peaking the delayed video signal.

3. A network as set forth in claim 1 wherein the delay associated with said delay means is substantially equal to one half the period of 3.58 MHz color subcarrier signal so as to cause the control signal appearing at said output terminal to be substantially free of 3.58 MHz signal components.

4. In a system for enhancing the sharpness of television images on a CRT, a network for receiving a video signal and generating therefrom a control signal for modulating the scan velocity of the CRT electron beam, a delayed video signal for intensity modulating the CRT electron beam with picture information, and preshoot and overshoot peaking components for peaking the delayed video signal so as to further enhance the sharpness of the television image, said network comprising:
   impedance means having an input port and an output port;
   delay means having an input port and an output port with its input port coupled to the output port of said impedance means, the impedance means having an impedance at its output port which is substantially equal to the characteristic impedance of the delay means;
   a reflecting termination coupled to the output port of said delay means, which termination is reflective of signals received from said delay means and in the frequency range of the video signal;
   means for applying the video signal to the input port of said impedance means;
   an output terminal at a point between said impedance means and said delay means from which the control signal is taken;
   means responsive to the current in the output port of said impedance means for generating a current $I_1$ proportional thereto;
   means responsive to the signal received by the reflecting termination for generating a current $I_2$ proportional thereto;
   means receiving the current $I_2$ for generating a voltage which is proportional to $I_2$ for use as said delayed video signal; and
   means receiving the currents $I_1$ and $I_2$ for generating a peaking signal proportional to $(I_1-I_2)$, said peaking signal consisting of preshoot and overshoot peaking components for application to and peaking of the delayed video signal.

5. In a system for enhancing the sharpness of television images on a CRT, a network for receiving a video signal and generating therefrom a control signal for modulating the scan velocity of the CRT electron beam, a delayed video signal for intensity modulating a CRT electron beam with picture information, and preshoot and overshoot peaking components for peaking the delayed video signal so as to further enhance the sharpness of the television image, said network comprising:

a first transistor having a base terminal, an emitter terminal and a collector terminal, with the base terminal receiving said video signal;

a first collector circuit branch coupled to the collector terminal of said first transistor, through which the collector current, $I_1$, of said first transistor flows;

impedance means coupled to the emitter terminal of said first transistor;

a delay line having an input terminal and an output terminal, with its input terminal serially coupled to said impedance means, the impedance means having an impedance equal to the characteristic impedance of the delay line;

a second transistor having a base terminal, a collector terminal and an emitter terminal, with the emitter terminal serially coupled to the output terminal of said delay line;

an output terminal at a point between the impedance means and the delay line from which the control signal is taken;

a resistance element connected between the emitter terminal of said second transistor and a reference voltage level;

a second collector circuit branch coupled to the collector terminal of said second transistor, through which the collector current, $I_2$, of said second transistor flows, said second collector circuit branch including a substantially linear resistance element serially coupled to the collector terminal of said second transistor and across which is developed a voltage for use as said delayed video signal; and means coupled to said first and second collector circuit branches for matrixing the currents $I_1$ and $I_2$ to develop a peaking signal proportional to $(I_1-I_2)$, said peaking signal consisting of preshoot and overshoot peaking components for application to and peaking of the delayed video signal.

\* \* \* \* \*